(12) United States Patent
Singh Ashta et al.

(10) Patent No.: US 9,800,486 B2
(45) Date of Patent: Oct. 24, 2017

(54) THROUGHPUT CHARACTERIZATION (71) Applicants: Jagjit Singh Ashta, Aalborg (DK); Anatoliy Ioffe, Hillsboro, OR (US); Xavier Carreno Bautista De Lisbona, Aalborg (DK); Tommy Nielsen, Aalborg (DK); Mikael Knudsen, Gistrup (DK); Guenter Krenz, Aalborg (DK); Wei Fan, Aalborg (DK); Jesper Nielsen, Aalborg (DK); Gert Pedersen, Storvorde (DK); Ondrej Franek, Aalborg (DK)

(72) Inventors: Jagjit Singh Ashta, Aalborg (DK); Anatoliy Ioffe, Hillsboro, OR (US); Xavier Carreno Bautista De Lisbona, Aalborg (DK); Tommy Nielsen, Aalborg (DK); Mikael Knudsen, Gistrup (DK); Guenter Krenz, Aalborg (DK); Wei Fan, Aalborg (DK); Jesper Nielsen, Aalborg (DK); Gert Pedersen, Storvorde (DK); Ondrej Franek, Aalborg (DK)

(73) Assignee: Intel IP Corporation, Santa Clara, CA (US)

( * ) Notice: Subject to any disclaimer, the term of this patent is extended or adjusted under 35 U.S.C. 154(b) by 30 days.

(21) Appl. No.: 14/779,243

(22) PCT Filed: May 8, 2014

(86) PCT No.: PCT/US2014/037355
§ 371 (c)(1),
(2) Date: Sep. 22, 2015

(87) PCT Pub. No.: WO2014/182938
PCT Pub. Date: Nov. 13, 2014

(65) Prior Publication Data
US 2016/0050133 A1 Feb. 18, 2016

Related U.S. Application Data (60) Provisional application No. 61/821,634, filed on May 9, 2013.

(51) Int. Cl.
H04L 12/26 (2006.01)
H04W 72/08 (2009.01)
(Continued)

(52) U.S. Cl.
CPC ........ *H04L 43/0888* (2013.01); *H04L 1/0002* (2013.01); *H04W 52/267* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 5,701,294 | A | 12/1997 | Ward et al. |
| 6,167,031 | A | 12/2000 | Olofsson et al. |

(Continued)

FOREIGN PATENT DOCUMENTS

| | | |
|---|---|---|
| WO | 2010/075899 A1 | 7/2010 |

OTHER PUBLICATIONS

International Search Report and Written Opinion dated Sep. 16, 2014 from International Application No. PCT/US2014/037355.
(Continued)

*Primary Examiner* — Chi H Pham
*Assistant Examiner* — Soon-Dong D Hyun
(74) *Attorney, Agent, or Firm* — Schwabe, Williamson & Wyatt, P.C.

(57) ABSTRACT

In embodiments, apparatuses, methods, and storage media may be described for characterizing throughput of a user equipment (UE) for transmission this transmitted using a modulation and coding scheme (MCS). Specifically, in
(Continued)

embodiments throughput of the UE may be characterized using interpolation of UE throughput for one or more discrete signal strength values.

20 Claims, 9 Drawing Sheets (51) Int. Cl.
  *H04L 1/00* (2006.01)
  *H04W 52/26* (2009.01)

(56) References Cited

U.S. PATENT DOCUMENTS

| | | | |
|---|---|---|---|
| 8,219,036 B2 | 7/2012 | Terry et al. | |
| 2007/0004465 A1 | 1/2007 | Papasakellariou et al. | |
| 2010/0054141 A1* | 3/2010 | Youn | H04H 20/42 370/252 |
| 2011/0075753 A1* | 3/2011 | Jung | H04L 1/0003 375/267 |
| 2012/0311173 A1* | 12/2012 | Agarwal | H04L 43/0829 709/231 |
| 2014/0031049 A1* | 1/2014 | Sundaresan | H04W 16/02 455/447 |
| 2014/0119222 A1* | 5/2014 | Chung | H04B 17/00 370/252 |
| 2014/0289313 A1* | 9/2014 | Kojima | H04L 43/0888 709/203 |

OTHER PUBLICATIONS

Schwarz, "Low Complexity Approximate Maximum Throughput Scheduling for LTE," Asilomar Conference on Signals, Systems, and Computers,Technische Universitat Wien, Vienna University of Technology, Nov. 9, 2010, 25 pages.

Vodafone, "Proposed new study item: Measurement of radiated performance for MIMO and multi-antenna reception for HSPA and LTE terminals," TSG-RAN Meeting #43, RP-0900352, Agenda item: 13, Mar. 3-6, 2009, Biarritz, France, 5 pages.

3GPP, "Verification of radiated multi-antenna reception performance of UEs in LTE/UMTS—performance aspects," RP-120368, for guidance, see 3GPP Working Procedures, article 39; and 3GPP TR 21.900, Mar. 1, 2012, 11 pages.

Extended European Search Report dated Nov. 14, 2016 from European Patent Application No. 14794982.0, 9 pages.

Pedersen et al., "MIMO 2c2 Absolute Data Throughput Concept Characterizing UE Performance in a Geometrically Defined Spatial Fading Scenario," 7th European Conference on Antennas and Propagation (EUCAP 2013)—Convened Sessions, 2013, 4 pages.

3GPP, "Universal Terrestrial Radio Access (UTRA) and Evolved Universal Terrestrial Radio Access (E-UTRA); Verification of radiated multi-antenna reception performance of User Equipment (UE) (Release 12)," 3GPP TR 37.977 V0.5.0 (Apr. 2013), Lte Advanced, 57 pages.

\* cited by examiner

THROUGHPUT CHARACTERIZATION

CROSS REFERENCE TO RELATED APPLICATIONS

The present application is a national phase entry under 35 U.S.C. §371 of International Application No. PCT/US2014/037355, filed May 8, 2014, entitled "THROUGHPUT CHARACTERIZATION", which claims priority to U.S. Provisional Patent Application No. 61/821,634, filed May 9, 2013, entitled "Advanced Wireless Communication Systems and Techniques," the entire disclosures of which are hereby incorporated by reference in their entireties.

FIELD

Embodiments of the present invention relate generally to the technical field of characterization of throughput for mobile devices in testing environments.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

It may be challenging to accurately characterize the downlink performance of multiple antenna devices that may be commonly used wireless communications of the current third generation partnership project (3GPP) long-term evolution (LTE) standard. One particular issue is the definition of a figure of merit, and the methodology for its rapid assessment. Methods currently employed to assess the figure of merit include an exhaustive search of the device under test (DUT) throughput performance as a function of transmission signal strength. The current method may have a relatively long measurement time, and generate an unrealistic representation of real-world performance of the DUT.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In embodiments, apparatuses, methods, and storage media may be described for characterizing throughput of a user equipment (UE) for transmissions that are transmitted using a modulation and coding scheme (MCS). Specifically, in embodiments throughput of the UE may be characterized using interpolation of UE throughput for one or more discrete signal strength values.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter.

However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
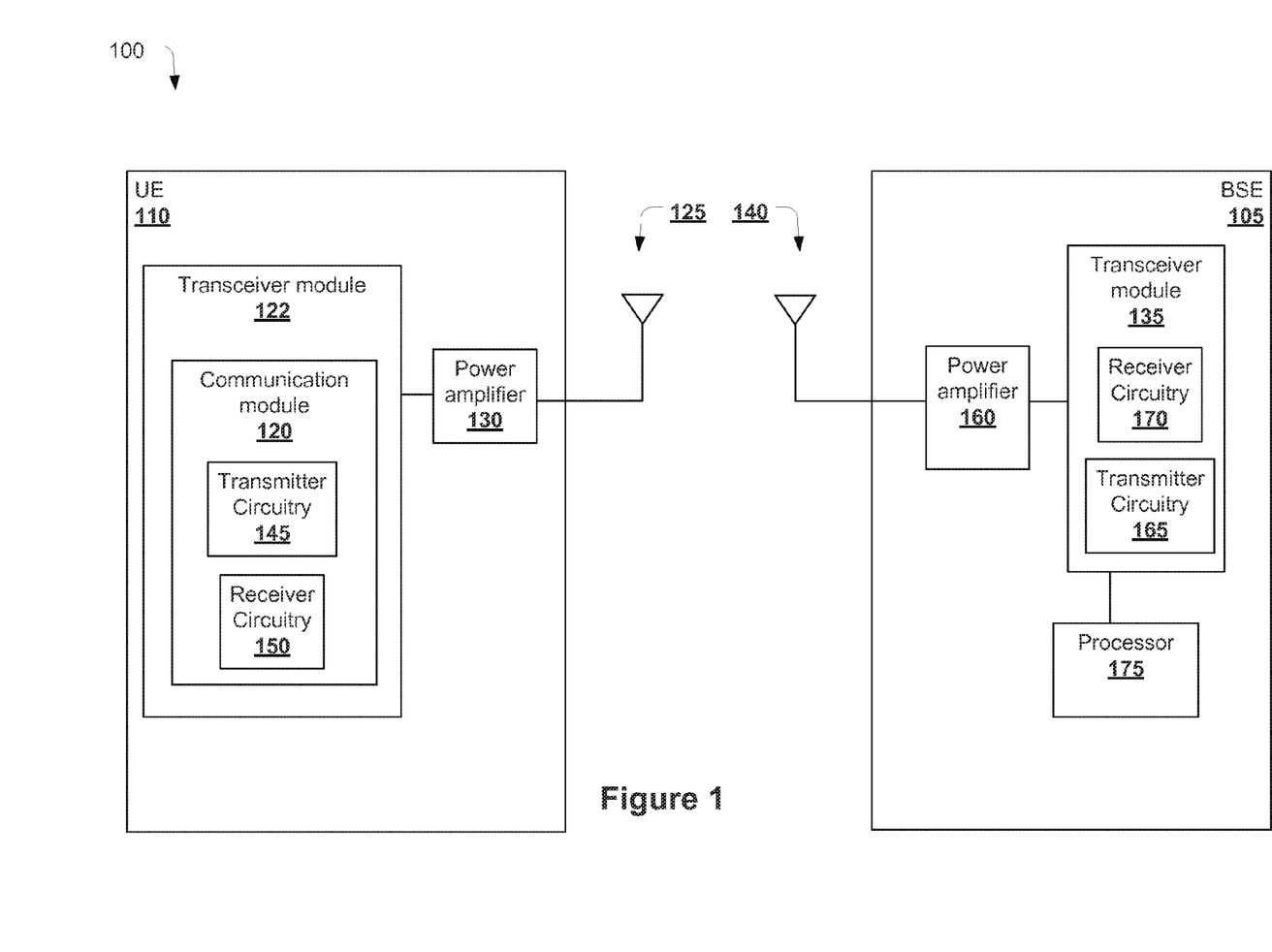
FIG. 1 schematically illustrates a high-level example of a network comprising a user equipment (UE) and a base station emulator (BSE), in accordance with various embodiments.

FIG. 1 schematically illustrates an example wireless network testing environment 100 (hereinafter "network 100") in accordance with various embodiments. The network 100 may include a DUT such as UE 110 coupled with a BSE 105. In some embodiments, the network 100 may be a testing environment of an access network of a third generation partnership project (3GPP) long term evolution (LTE) network such as evolved universal terrestrial radio access network (E-UTRAN). In these embodiments the BSE 105 may be configured to simulate a 3GPP-defined eNodeB (eNB, also referred to as an evolved NodeB) configured to wirelessly communicate with the UE 110 using a wireless protocol such as the 3GPP LTE wireless protocol.

As shown in FIG. 1, the UE 110 may include a transceiver module 122, which may also be referred to as a multi-mode transceiver chip. The transceiver module 122 may be configured to transmit and receive wireless signals. Specifically, the transceiver module 122 may be coupled with one or more of a plurality of antennas 125 of the UE 110 for communicating wirelessly with other components of the network 100, e.g., BSE 105 or another UE. The antennas 125 may be powered by a power amplifier 130 which may be a component of the transceiver module 122, or coupled with the transceiver module 122 and generally between the transceiver module 122 and the antennas 125 as shown in FIG. 1. In one embodiment, the power amplifier 130 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 122 may include a communication module 120, which may be referred to as a broadband module. Communication module 120 may contain both transmitter circuitry 145 configured to cause the antennas 125 to transmit one or more signals from the UE 110, and receiver circuitry 150 configured to cause the antennas 125 to receive one or more signals at the UE 110. In other embodiments, the communication module 120 may be implemented in separate chips or modules, for example one chip including the receiver circuitry 150 and another chip including the transmitter circuitry 145. In some embodiments the signals may be cellular signals transmitted to or received from a 3GPP eNB as emulated by BSE 105.

Similarly to the UE 110, the BSE 105 may include a transceiver module 135. The transceiver module 135 may be further coupled with one or more of a plurality of antennas 140 of the BSE 105 for communicating wirelessly with other components of the network 100, e.g., UE 110. The antennas 140 may be powered by a power amplifier 160 which may be a component of the transceiver module 135, or may be a separate component of the BSE 105 generally positioned between the transceiver module 135 and the antennas 140 as shown in FIG. 1. In one embodiment, the power amplifier 160 may provide the power for all transmissions on the antennas 140. In other embodiments, there may be multiple power amplifiers on the BSE 105. The use of multiple antennas 140 may allow for the BSE 105 to use transmit diversity techniques such as SORTD, MIMO, or FD-MIMO. In certain embodiments the transceiver module 135 may contain both transmitter circuitry 165 configured to cause the antennas 140 to transmit one or more signals from the BSE 105, and receiver circuitry 170 configured to cause the antennas 140 to receive one or more signals at the BSE 105. In other embodiments, the transceiver module 135 may be replaced by transmitter circuitry 165 and receiver circuitry 170 which are separate from one another (not shown). In some embodiments, though not shown, the transceiver module 135 may include a communication module such as communication module 120 that includes the receiver circuitry 170 and the transmitter circuitry 165. In some embodiments, the transceiver module 135 may be coupled with a processor 175 configured to analyze signals received by the BSE 105 from the UE 110, as explained in greater detail below.

Figure 2:
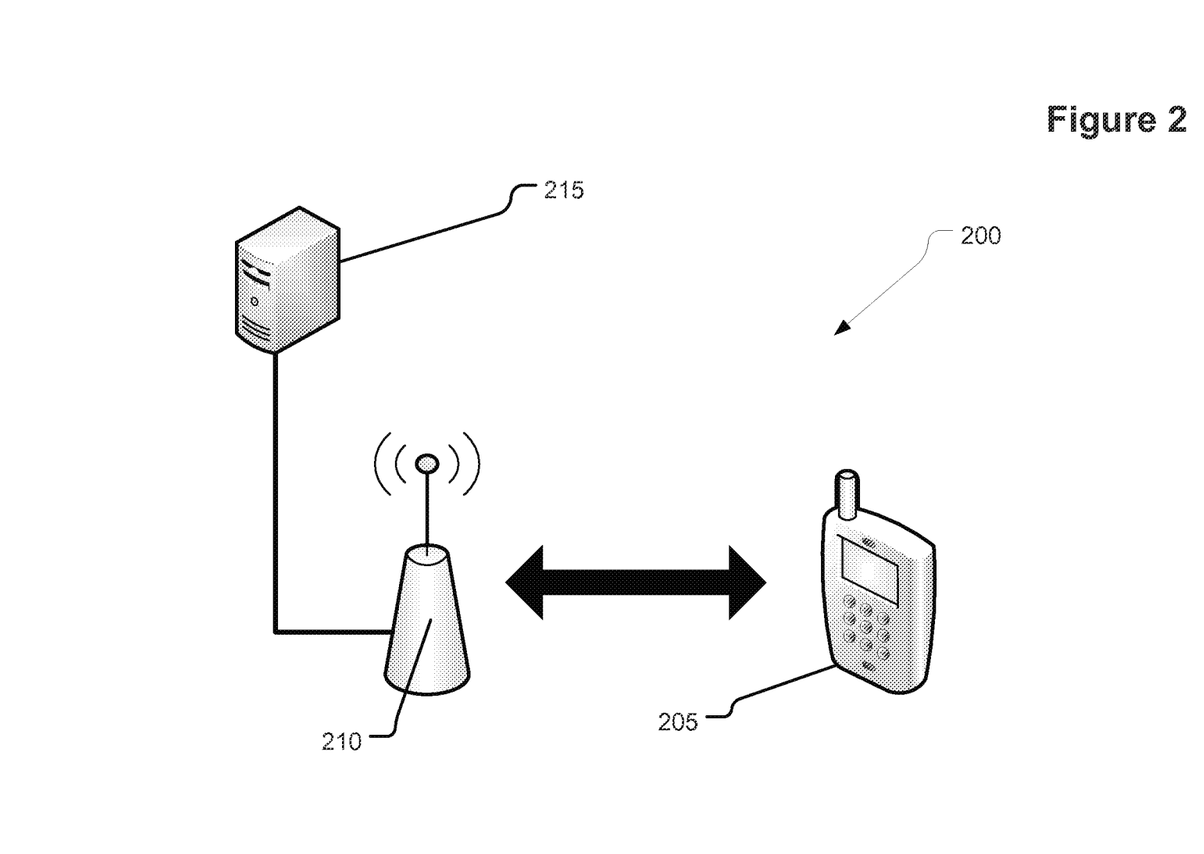
FIG. 2 illustrates a high level example of a testing environment, in accordance with various embodiments.

FIG. 2 illustrates a high level example of a testing environment 200. Specifically, current multiple input multiple output-over the air (MIMO-OTA) throughput measurements may include at least a set of equipment shown in FIG. 2. In this setup, a BSE 210, which may be similar to BSE 105 of FIG. 1, may measure the performance of a UE 205, which may be similar to UE 110 of FIG. 1. In some embodiments, the BSE 210 may also be referred to as a radio communication tester.

In some embodiments, the testing environment 200 may be controlled by test automation software that controls various instruments, test set up, and collection of data related to throughput of the UE 205. The test automation software may control, among other things, the measurement procedure and methodology to be adopted by the BSE 210. The software may be embedded inside one of the instruments of the setup, for example the BSE 210, or may be external to the testing instruments and located in an external computer such as computer 215 that may be coupled with BSE 210. In some embodiments, the BSE 210 may be coupled with, or otherwise include, a channel emulator (not shown) configured to replicate real-world situations such as fading, noise, or special channel conditions in the test environment. In some embodiments, the testing environment 200 may include additional equipment such as rotational positioners coupled with the UE 205, measurement antennas coupled with the BSE 210 or computer 215, or other equipment.

Typically, in a digital network such as an LTE network, an eNB may transmit data to a UE utilizing radio frequency resources that are divided into frames and subframes in the time domain, and resource blocks and subcarriers and frequency domain. As an example, in the time domain a radio frame may span approximately 10 milliseconds (ms), and be comprised of 10 subframes each spanning 1 ms. Similarly, in the frequency domain a resource block may include a number of subcarriers such as 12 subcarriers, 24 subcarriers, or some other number of subcarriers.

The transmitted data may be organized into transport blocks spanning several resource block pairs. Each transport block may be assigned a forward error correcting code rate and modulation scheme. If the fading conditions or signal strength change between the eNB and UE, link adaptation algorithms may utilize feedback provided to the eNB by the UE to modify the modulation and coding scheme (MCS), which may result in increasing downlink throughput. Throughput may be the rate of successful transport block delivery over a communication channel. Specifically, downlink throughput may be the rate of successful transport block delivery in a downlink transmission from the eNB to the UE. The MCS may relate one or more parameters of the wireless downlink transmission such as the data rate, the coding rate, the modulation type, or the number of spatial streams used in the wireless transmission.

Under these conditions, a UE such as UE 205 may experience multiple transitions among different MCSs, but it is notable that there may be a limited range of signal strength conditions under which it may be desirable for the UE to operate in any single given MCS. As a result, given the overall fading statistics between an eNB such as eNB 210, and a UE such as UE 205, it may be possible to characterize the UE performance per MCS in terms of a single point rather than a complete curve. This characterization of the UE performance per MCS as a point rather than a curve may be beneficial because a complete curve may require an exhaustive search to measure.

Specifically, currently known MCS performance measurements may require a full characterization of MCS performance under a given set of fading conditions. This characterization may require an exhaustive measurement of throughput for each signal strength in the measured range for the MCS curve. Given the accuracy requirements on each measurement point, measurement over the range may require measuring throughput over 20,000 subframes per point, which may result in a time requirement of 20 seconds per point, because transmission of one subframe may require 1 ms in an LTE network. The number of points (with, for example, a 0.5 decibel (dB) step size) required to measure an entire MCS curve may span a range of 15 to 30 dB (30 to 60 points), which may result in the measurement time required for a single curve being up to approximately 10 minutes. Radiated performance of the UE such as UE 205 with the fixed MCS may be characterized for multiple testing environment conditions, which may reach counts of over 2 to 4 dozen (including 12 physical orientations of the UE 205 per environment condition, and 2 to 4 different applicable environment conditions). Thus, testing time of a single UE 205 may exceed 8 hours.

Embodiments described herein may reduce the number of measured points per MCS curve to approximately O(log n) performance. Additionally, embodiments described herein may describe figures of merit for each environment condition separately; these figures may then be averaged across environment conditions to compute an aggregate measure of performance.

Figure 3:
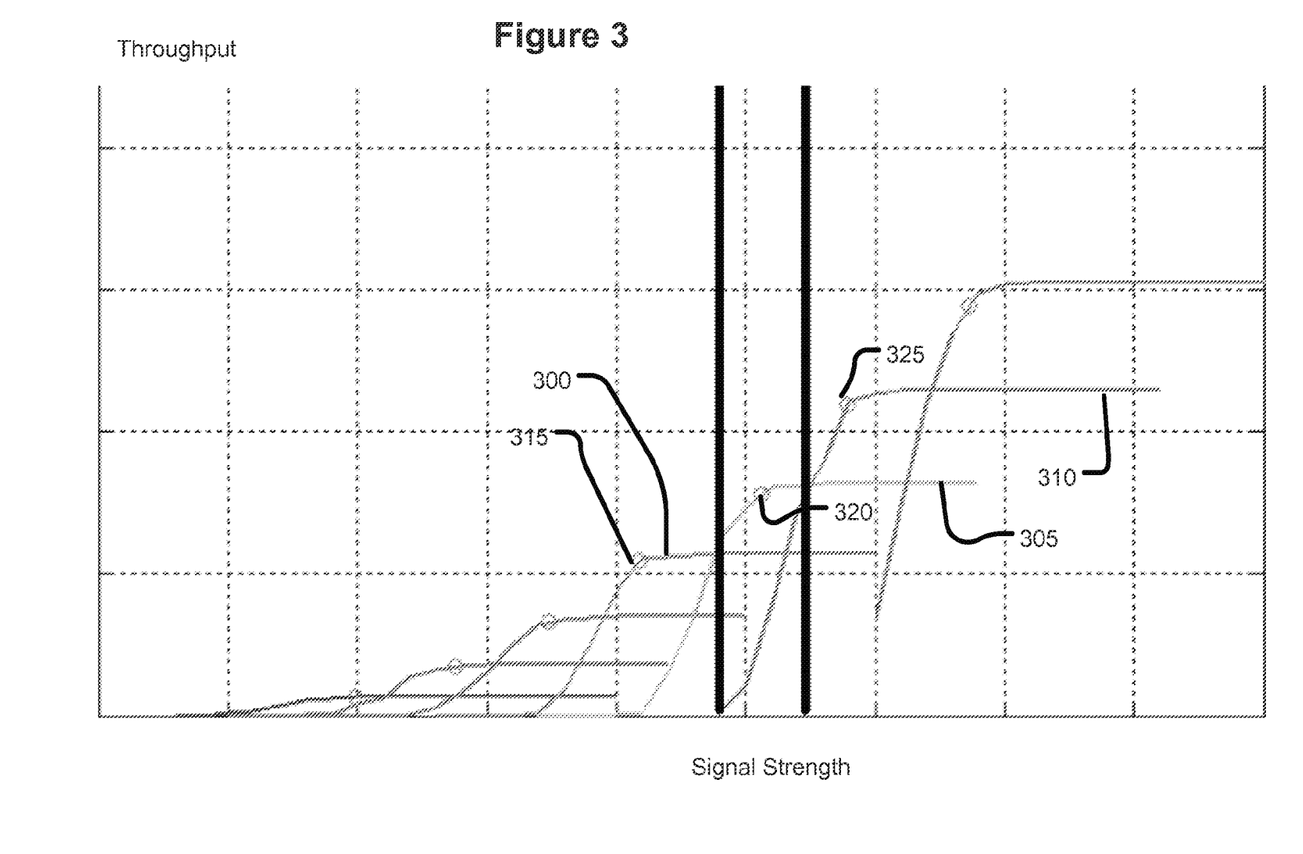
FIG. 3 illustrates the example of various modulation and coding scheme (MCS) curves, in accordance with various embodiments.

FIG. 3 illustrates an example of various MCS curves. Specifically, each MCS curve may measure downlink throughput as a function of transmitted signal strength for a given MCS. In other words, the downlink throughput may be a function of signal strength of a transmission from a BSE such as BSE 210 to a UE such as UE 205. FIG. 3 includes a plurality of MCS curves including a first MCS curve 300, a second MCS curve 305, a third MCS curve 310, etc. As can be seen in FIG. 3, throughput for a given MCS curve may increase until it starts to reach a maximum throughput for that MCS curve. At that point, as signal strength increases, throughput of the UE may increase if an MCS related to a different MCS curve is used for the downlink transmission. For example, it can be seen that at a given signal strength the throughput may be higher if the downlink transmission is transmitted utilizing the MCS represented by MCS curve 305 rather than the MCS represented by MCS curve 300. As shown in FIG. 3, it may only be desirable for the transmission to be transmitted with the MCS represented by MCS curve 305 between the two solid black vertical lines. If the signal strength of the downlink transmission decreases below the leftmost solid black line, it may be more desirable for the downlink transmission to utilize the MCS represented by MCS curve 300. Conversely, if the signal strength increases above the rightmost solid black vertical line, it may be desirable for the downlink transmission to utilize the MCS represented by MCS curve 310.

As the number of MCS combinations increases, the range of signal strength values necessary to characterize the throughput of a UE receiving transmissions transmitted with a given MCS may reduce because it may only be necessary to measure the throughput for the MCS over the signal strength values where that MCS would be desirable (i.e. it may only be desirable for a downlink transmission to use the MCS represented by MCS curve 305 for a signal strength between the solid black vertical lines as described above). One simplification of this measurement of a range of values per MCS curve may be to search for a signal strength value necessary to achieve a particular percentage of maximum throughput for a transmission transmitted utilizing a given MCS. This percentage of maximum throughput may be considered a "threshold" or "target" throughput value. In some embodiments, the target throughput value may be a percentage of a maximum throughput value of a given MCS curve. For example, a target throughput value for MCS curve 305 may be 70% of the maximum throughput value of MCS curve 305, 95% of the maximum throughput value of MCS curve 305, or some other value or percentage. For example, the target throughput of MCS curve 300 may be indicated by point 315. Similarly, the target throughput for MCS curve 305 may be represented by point 320, and the target throughput for MCS curve 310 may be indicated by point 325. This target throughput for the given MCS may be related to a figure of merit of the UE 205, as will be described in greater detail below.

Figure 4:
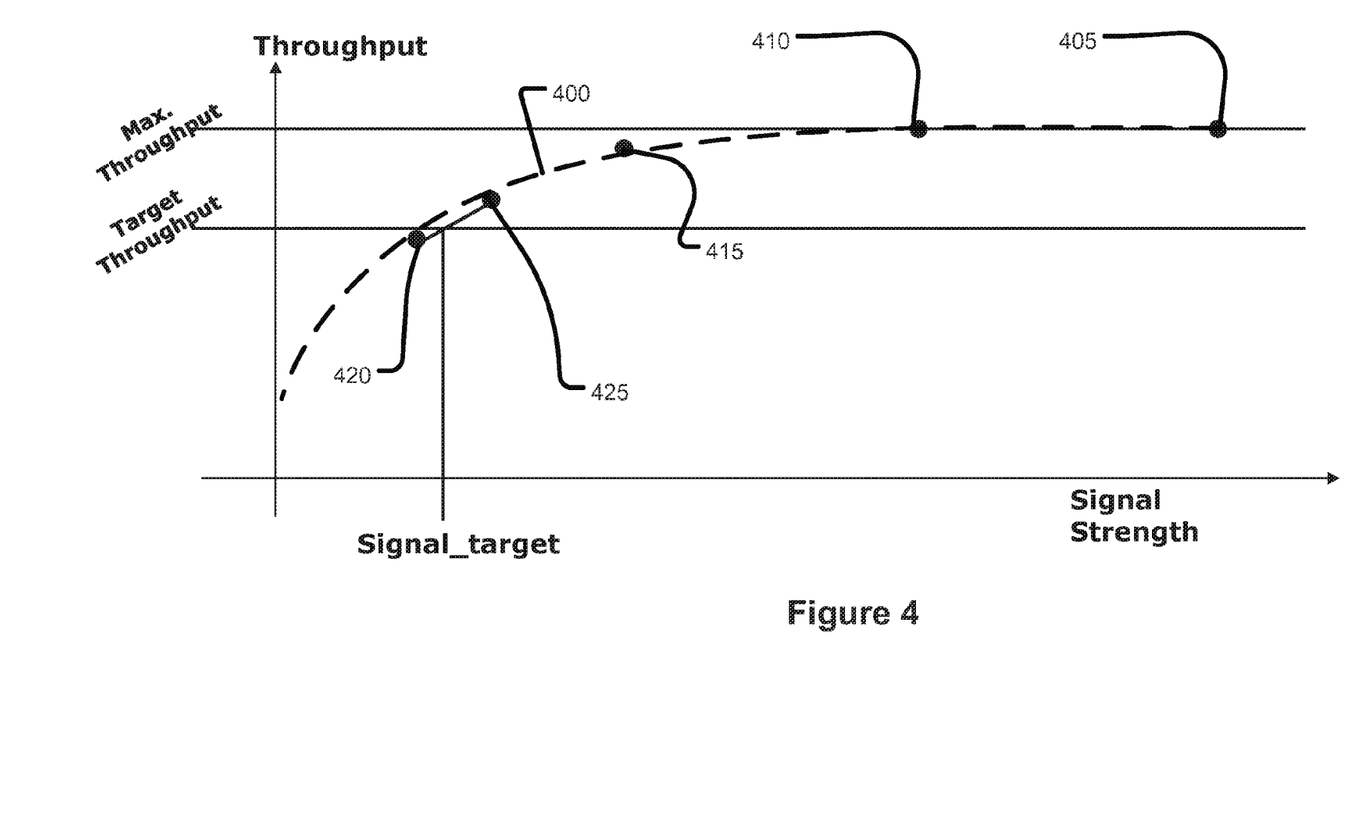
FIG. 4 graphically illustrates an example of characterizing throughput of a UE, in accordance with various embodiments.

FIG. 4 graphically depicts one example process for identifying a signal strength related to a target throughput for UE such as UE 205 in a testing environment such as testing environment 200. Specifically, assume that the MCS curve for the MCS being tested is represented by dashed line 400. The MCS curve 400 may describe throughput of the UE in response to a transmission from a BSE such as BSE 210 using a given MCS. The MCS curve 400 may produce maximum throughput as indicated by the solid line labeled "Max. Throughput." It may be desirable to identify the signal strength represented by "Signal_target," which may correspond to a target throughput represented by "Target Throughput." In order to identify Signal_target, the throughput of the UE may first be measured at a signal strength corresponding to Max. Throughput at point 405. The throughput at point 405 may be measured using a relatively low number of subframes, for example 1,000 subframes. The signal strength may then be incrementally decreased and measured at, for example points 410, 415, and 420. At each measurement, the measured throughput may be compared to the target throughput. If the measured throughput is above the target throughput, then the signal strength may continue to be decreased.

However, if the measured throughput is below the target throughput, as indicated for example at point 420, then the throughput may can be measured at point 420 over an increased number of subframes, for example 20,000 subframes. The signal strength may then be increased by an increment smaller than the increments used between points 405 and 410, and remeasured using the relatively high number of subframes. For example the signal strength may be increased and throughput may be measured at point 425 using the increased number of subframes such as 20,000 subframes. Based on the measured throughput at points 420 and 425, the signal strength that is related to the target throughput, for example Signal_target, may then be approximated using the data from points 420 and 425. For example the approximation may be linear approximation, interpolation, or some other approximation.

Figure 5:
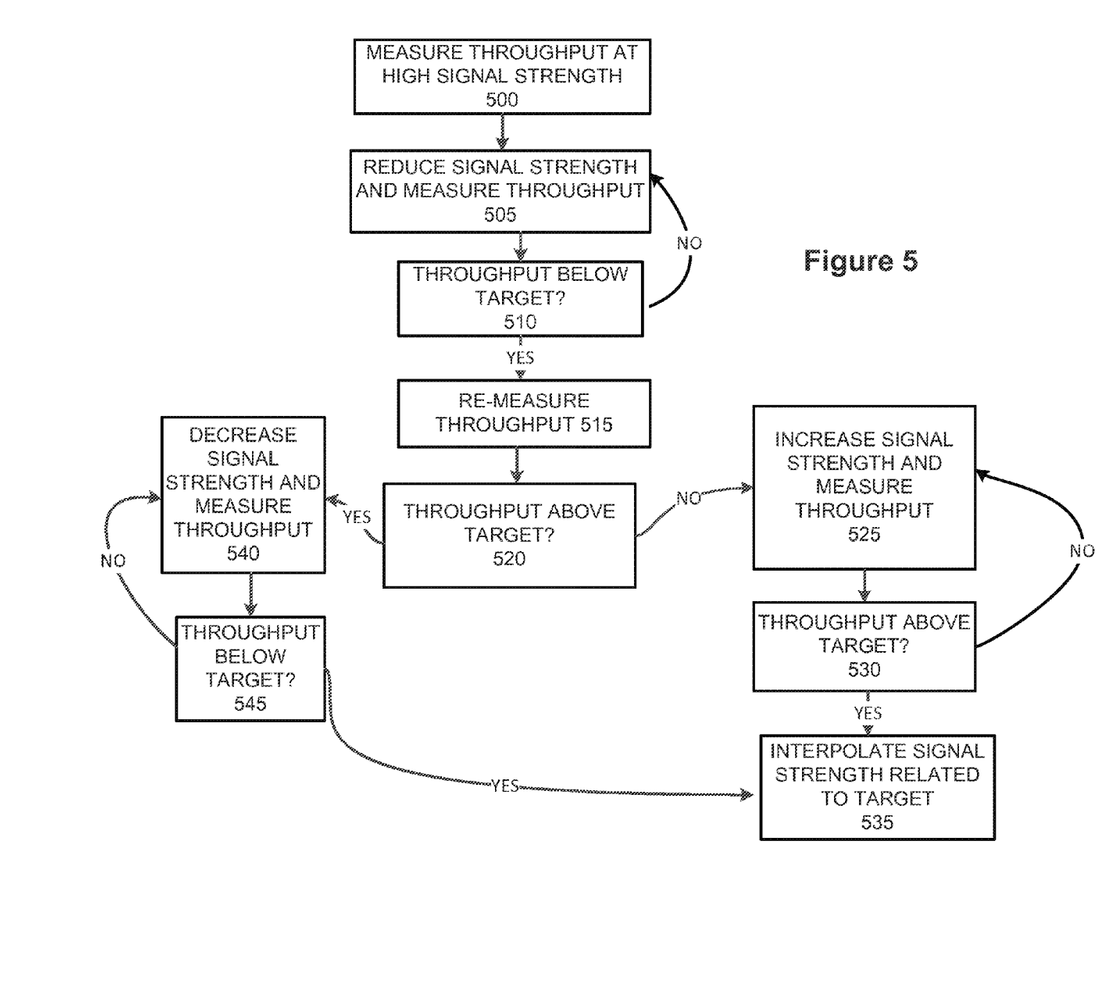
FIG. 5 illustrates an example process for characterizing throughput of a UE, in accordance with various embodiments.

FIG. 5 illustrates an example process for characterizing throughput of a UE such as UE 205 for an MCS curve according to the embodiment described in FIG. 4. Initially, throughput of the UE may be measured at a high signal strength over a relatively low number of subframes at 500. The high signal strength may be, for example a signal strength that corresponds to a maximum throughput of the UE, or a maximum possible signal strength for transmissions from the BSE such as BSE 210. The relatively low number of subframes may be, for example, 1,000 subframes.

In other embodiments, the relatively low number of subframes may be a different number of subframes.

The signal strength may then be reduced and the throughput of the UE may be remeasured at 505 over the relatively low number of subframes. In some embodiments, the signal strength may be reduced according to a given interval such as 1 dB, 0.5 dB, or some other interval. The BSE, or specifically a processor of the BSE such as processor 175 of BSE 105, may analyze at 510 whether the throughput at the reduced signal strength is below the target throughput. If the throughput of the UE at the reduced signal strength is not below the target throughput, then the process may return to element 505, and again reduce the signal strength by the interval and measure the throughput of the UE at the reduced signal strength over the relatively low number of subframes.

Once the BSE identifies that the throughput is below the target throughput, then the BSE may remeasure the throughput at the reduced signal strength at 515 over a relatively high number of subframes, for example 20,000 subframes. In other embodiments the relatively high number of subframes may be a different number of subframes that may result in a relatively accurate measurement of the throughput of the UE. In some cases, the measurement over the relatively high number of subframes may result in a different measured throughput than the measurement at a relatively low number of subframes because the measurement at the relatively low number of subframes may be less accurate than the measurement at the relatively high number of subframes. Therefore, even though the throughput measured over the relatively low number of subframes may produce a measured throughput below the target throughput, the throughput measured over the relatively high number of subframes may produce a measured throughput that is above the target throughput. Therefore, the BSE, or the processor of the BSE, may identify whether the throughput measured over the relatively high number of subframes is above the target throughput at 520.

If the throughput measured at the relatively high number of subframes is not above the target throughput, then the signal strength may be increased and the throughput may be measured over the relatively high number of subframes at 525. In some embodiments, the interval for increasing the signal strength may be less than the interval that was previously used to decrease the signal strength, for example between points 405 and 410 of FIG. 4. In some embodiments, as noted above, the interval for decreasing the signal strength between points 405 and 410 may have been 1 dB. By contrast, the interval for increasing the signal strength and measuring the throughput at 525 may be, for example, 0.5 dB. In other embodiments, other intervals may be used.

The BSE may then measure whether the throughput using the increased signal strength from element 525 is above the target throughput at 530. If the measured throughput at 530 is not above the target throughput, then element 525 may be repeated. However, if the measured throughput is above the target throughput, then the BSE, or specifically the processor of the BSE, may interpolate the signal strength related to the target throughput at 535. This interpolated signal strength may correspond to Signal_target of FIG. 4.

Returning to element 520, if the throughput measured at 515 is about the target throughput, then the signal strength may be decreased and the throughput may be remeasured at the decreased signal strength over the relatively high number of subframes at 540. Similarly to element pattern 25, this decrease in signal strength at 540 may be over an interval that is less than the interval that was previously used to decrease the signal strength that, for example, element 505. Specifically, if the reduction in signal strength at element 505 was 1 dB, then the reduction in signal strength that element 540 may be, for example 0.5 dB. In other embodiments other intervals may be used.

The BSE may then identify whether the throughput measured at 540 is below the target throughput at 545. If the throughput is not below the target throughput at 545, then the process may return to element 540. However, if the throughput is below the target throughput at 545, then the BSE may use the throughput measured over the relatively high number of subframes that is above the target throughput, and the throughput measured over the relatively high number of subframes is below the target throughput, and interpolate the signal strength related to the target throughput at 535. The interpolated signal strength may correspond to Signal_target of FIG. 4.

As shown in FIG. 4, if Signal_target is identified using linear approximation or interpolation, the identified Signal_target may not directly correspond to a point on the MCS curve, however Signal_target may be considered a strong approximation within a margin of error. In other embodiments, different mathematical operations may produce a different Signal_target. However, in many embodiments, the process illustrated by FIGS. 4 and 5 may be significantly faster than existing testing methodologies.

Figure 6:
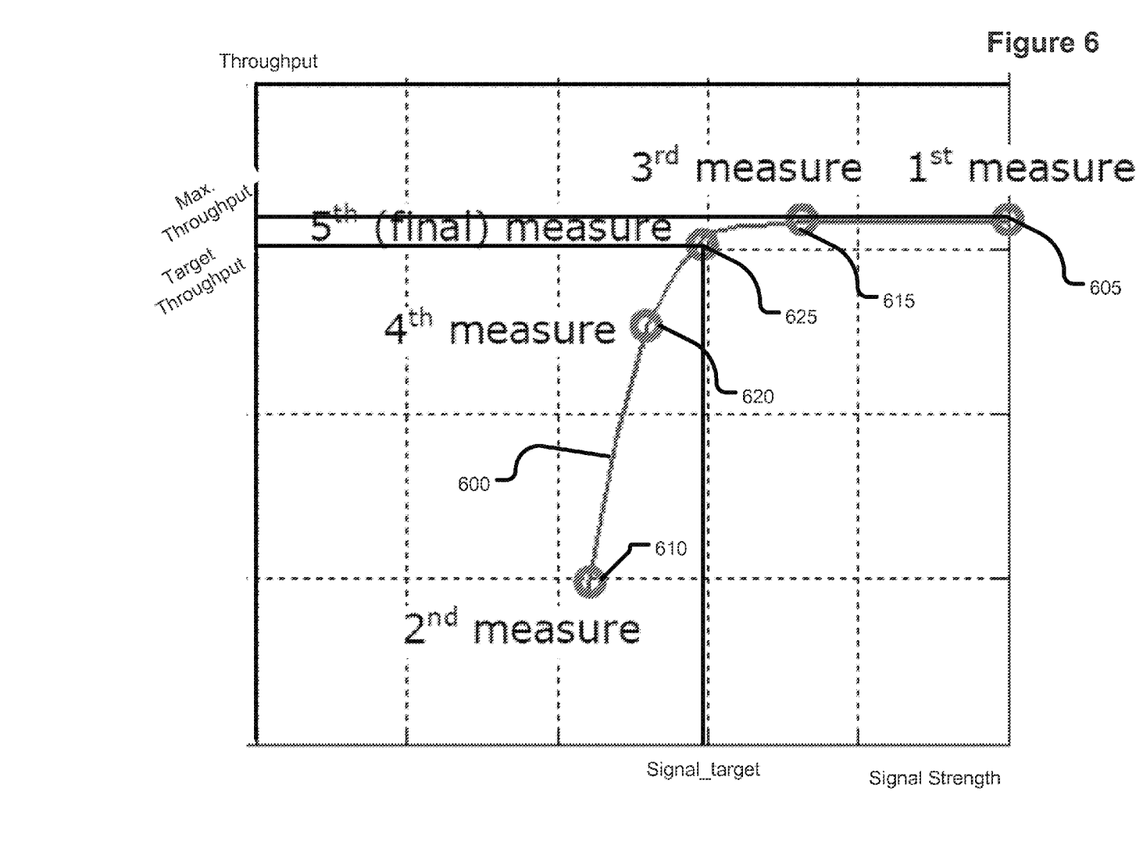
FIG. 6 graphically illustrates an alternative example of characterizing throughput of a UE, in accordance with various embodiments.

FIG. 6 graphically illustrates an alternative example of characterizing throughput of a UE such as UE 205 in a testing environment such as testing environment 200 for an MCS curve such as MCS curve 600. Specifically, MCS curve 600 may describe throughput of the UE in response to a downlink transmission from the BSE such as BSE 210 using a given MCS over a variety of signal strengths, as described above.

In the embodiment depicted in FIG. 6, Signal_target may be identified using a different process than the embodiment depicted in FIGS. 4 and 5. Specifically, a first measurement may be made at point 605, which may correspond to the maximum signal strength and/or the maximum throughput of the MCS curve 600. Next, a second measurement may be made at point 610 which may correspond to a minimum throughput and/or minimum signal strength of the MCS curve 600. Next, a third measurement may be made at point 615, which may be a midpoint between the first point 605, and the second point 610. The third point 615 may be a midpoint that is equidistant from the first point 605, and the second point 610. In other embodiments, the third point 615 may be some other point that is between the first point 605 and the second point 610.

As shown in FIG. 6, the throughput measured at point 615 may be higher than the target throughput. Therefore, a fourth point 620 may be defined that is the midpoint between point 615 and point 610. The throughput may be measured at the fourth point 620. As shown in FIG. 6, the throughput measured at the fourth point 620 may be below the target throughput. Therefore, a fifth point 625 may be defined as the midpoint between the third measurement it point 615, and the fourth measurement point 620. The measurement may be performed at point 625 which may be approximately equal to the target throughput. Therefore, Signal_target may be defined as the signal strength corresponding to the target throughput as indicated by point 625.

Although in the embodiment described in FIG. 6, measurements at points such as the third, fourth, or fifth points are described as being a midpoint between two other points, and other embodiments the points may be as some other location between the two existing points. For example, in some embodiments the points may not be a midpoint, but may be a mean, median, an average, or a fraction of one or more other known points. Additionally, in some embodiments the final point corresponding to the target throughput and Signal_target, for example in this embodiment point 625, may not be exactly equal to the target throughput, but may be within an acceptable margin of error of the target throughput.

Figure 7:
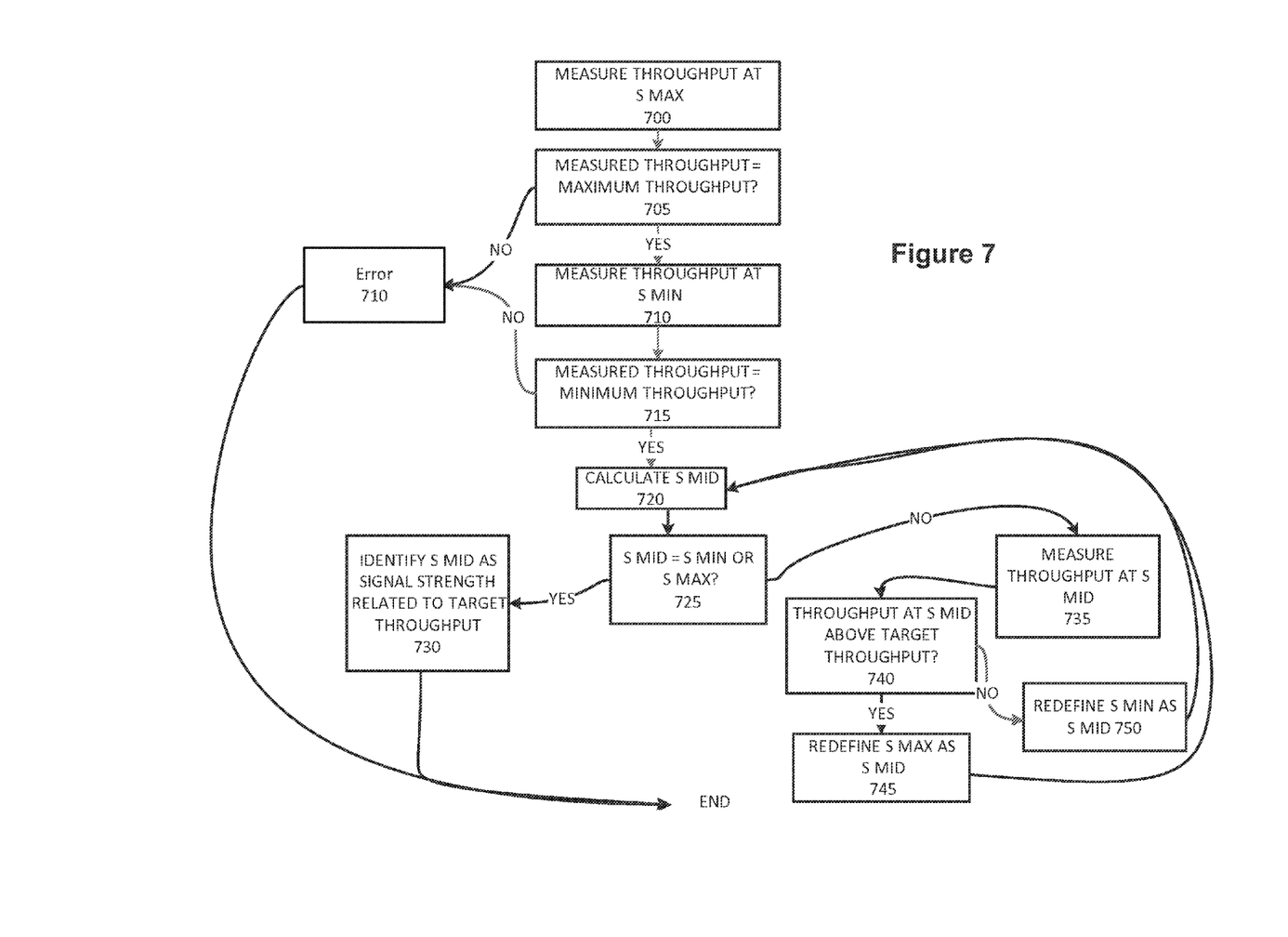
FIG. 7 illustrates an alternative example process for characterizing throughput of a UE, in accordance with various embodiments.

FIG. 7 depicts an example process corresponding to the embodiment graphically depicted in FIG. 6. Initially, the throughput of a UE such as UE 205 may be measured at a relatively high signal strength at 700. In some embodiments, the signal strength may be the highest possible signal strength for the testing environment. As used herein, this relatively high signal strength will be referred to as $S_{MAX}$. Next, a BSE such as BSE 210 may measure whether the throughput achieved at $S_{MAX}$ is equal to the relatively high throughput such as the maximum throughput at 705. If the throughput measured at $S_{MAX}$ is not equal to the maximum throughput, then the BSE may identify an error is 710, and the process may end.

However, if the throughput measured at $S_{MAX}$ is equal to the maximum throughput, then the BSE may measure at 710 the throughput at a relatively low signal strength such as the minimum signal strength value possible for the test under all testing conditions. The signal strength may be referred to as $S_{MIN}$. In some embodiments, $S_{MIN}$ may be defined by one or more standards such as a 3GPP standard. Next, the BSE may identify whether the measured throughput at $S_{MIN}$ is equal to a relatively low throughput such as the minimum throughput possible in the testing conditions at 715. Similarly to element 705, if the measured throughput at $S_{MIN}$ is not equal to the minimum possible throughput at 715, the system may identify an error at 710, and the process may end.

However, if the measured throughput at $S_{MIN}$ is identified as equal to the minimum possible throughput at 715, the BSE may then calculate $S_{MID}$ 720. Specifically, $S_{MID}$ may be the signal strength at the midpoint between $S_{MAX}$ and $S_{MIN}$. In some embodiments, $S_{MID}$ may not be at the exact midpoint, but may be approximated to the closest signal strength interval which may be, for example 1 dB, 0.5 dB, or some other interval. In some embodiments, $S_{MID}$ may not be midpoint, but may be an average, mean, median, or some other point between $S_{MIN}$ and $S_{MAX}$, as described above.

Next, the BSE may identify whether $S_{MID}$ is equal, or approximately equal within a margin of error or signal strength interval, to $S_{MIN}$ or $S_{MAX}$ at 725. If the BSE identifies that $S_{MID}$ is equal, or approximately equal, to $S_{MIN}$ or $S_{MAX}$ at 725, then the BSE may identify $S_{MID}$ as Signal_target is 730, and the process may end. However, if the BSE identifies at 725 that $S_{MID}$ is not equal to $S_{MIN}$ or $S_{MAX}$, then the BSE may measure the throughput at $S_{MID}$ at 735. The BSE may then identify whether the throughput it $S_{MID}$ is above the target throughput at 740.

If the throughput at $S_{MID}$ is above the target throughput, then that may indicate that the signal strength value corresponding to $S_{MID}$ is higher than Signal_target. Therefore, the BSE may redefine $S_{MAX}$ as $S_{MID}$ at 745. In other words, the maximum signal strength value may be redefined as the current mid-signal strength value. The process may then return to element 720, and a new $S_{MID}$ may be calculated. Conversely, if the throughput at $S_{MID}$ is below the target throughput, then that may indicate that the signal strength value corresponding to $S_{MID}$ is lower than Signal_target. In that case, the BSE may redefine $S_{MIN}$ has $S_{MID}$ has 750. The other words, the minimum signal strength value may be redefined as the current mid-signal strength value. The process may then return to element 720, and a new $S_{MID}$ may be calculated. As described with reference to FIG. 6, this process may iterate until $S_{MID}$ is equal to, or approximately equal to, $S_{MIN}$ or $S_{MAX}$, at which point Signal_target may be identified.

Even though the terms minimum and maximum are used above, as used the terms minimum and maximum may be recognized as being context dependent. In other words, the terms minimum and/or maximum may refer to a minimum or maximum for a specific configuration, MCS, desired test, or one or more other considerations. Generally, minimum and maximum may be understood to refer to a lowest initial starting point and a highest initial starting point for the purposes of FIGS. 6 and 7.

Additionally, in some embodiments one or more of the elements of FIGS. 4 through 7 may be considered to be optional. For example, in some embodiments one or both of processes 705 or 715 may not be performed. In some embodiments, elements of the processes of FIGS. 4 through 7 may be performed in a different order than illustrated. In some embodiments, the processes of FIGS. 4 through 7 may include additional or alternative elements.

In some embodiments, it may be desirable to test the UE in a variety of different physical orientations. Specifically, a UE such as UE 205 may experience a different throughput dependent on its physical orientation with respect to a BSE such as BSE 210. In some embodiments, Signal_target may be used to speed up measurement time for one or more other physical orientations of the UE. Specifically, for other physical orientations, Signal_target may be used as an initial seed value for subsequent throughput measurements for other orientations of the UE. If the subsequent throughput measurements using Signal_target are not equal, or approximately equal, to the target throughput, then measurements using a higher or lower signal strength level may be performed.

Figure 8:
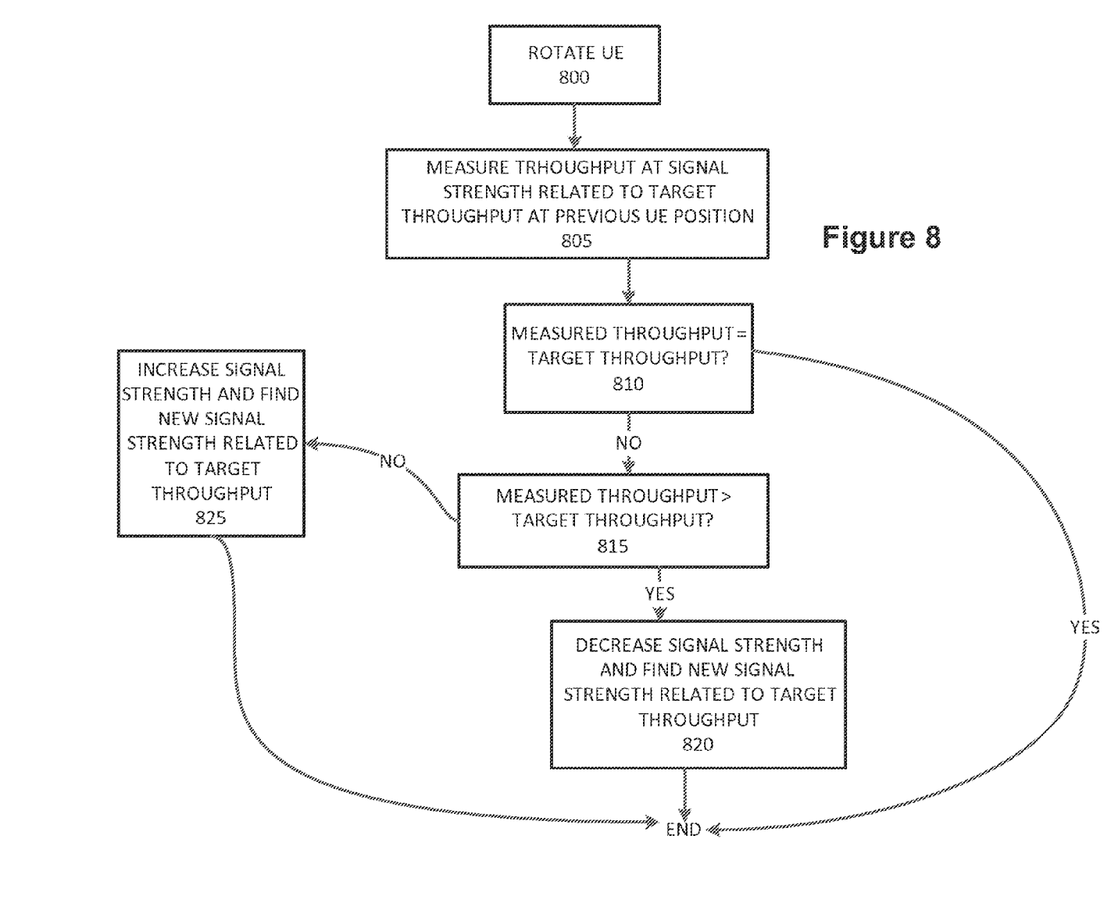
FIG. 8 illustrates an example process for characterizing throughput of a UE in a different physical configuration, in accordance with various embodiments.

FIG. 8 depicts an example process for testing throughput at different physical orientations of a UE such as UE 205. Initially, the UE may be physically rotated at 800. The throughput at Signal_target may then be measured at 805, for example by the BSE such as BSE 210. In other embodiments, the signal strength may be a different signal strength such as a signal that is based on Signal_target and then altered by one or more known factors. The BSE may then identify whether the throughput measured for the UE in the new orientation for a transmission on the MCS curve using the signal strength identified by Signal_target is equal to the target throughput at 810. If the measured throughput is equal to the target throughput, the process may end.

If the throughput measured at 810 is not equal to the target throughput, then the BSE may identify whether the measured throughput is greater than the target throughput at 815. If the measured throughput is greater than that target throughput, then the signal strength may be decreased using a process similar to one of the processes described in FIGS. 4 through 7 at 820. If the measured throughput is less than the target throughput, then the signal strength may be increased using a process similar to one of the processes described in FIGS. 4 through 7 at 825. This process may be repeated for one or more different physical orientations of the UE.

In some embodiments, the UE 205 may be rotated and tested at several different physical orientations. For example, the UE 205 may be rotated and tested in 12 different physical orientations, though in other embodiments the UE 205 may be tested at more or less orientations. A figure of merit may be identified based on the Signal_target that is identified at each of the orientations for one or more target throughput values. For example, a first figure of merit may be identified based on an average of the Signal_target value for each of the 12 orientations of the UE 205 for a target throughput value of 95% of the maximum target throughput value. A second figure of merit may be identified based on an average of the Signal_target value for each of the 12 orientations of the UE 205 for a target throughput value of 70% of the maximum target throughput value. In some embodiments, an overall figure of merit for the UE 205 may be identified based on a combination of the first and second figures of merit.

It will be understood that the above described examples are intended to be non-limiting, and in other embodiments the figure of merit may be identified in other ways. For example, in other embodiments, the figure of merit may be identified using a different mathematical operation such as a sum, a mean, a median, or some other mathematical operation related to the Signal_target values. In some embodiments, the figure of merit may be identified based on the Signal_target values at more or less physical orientations of the UE 205, or different target throughput values. In some embodiments, the figure of merit may be identified based on Signal_target values for multiple MCS curves. In other embodiments, the figure of merit may be identified based on other additional or alternative factors to those listed above.

Figure 9:
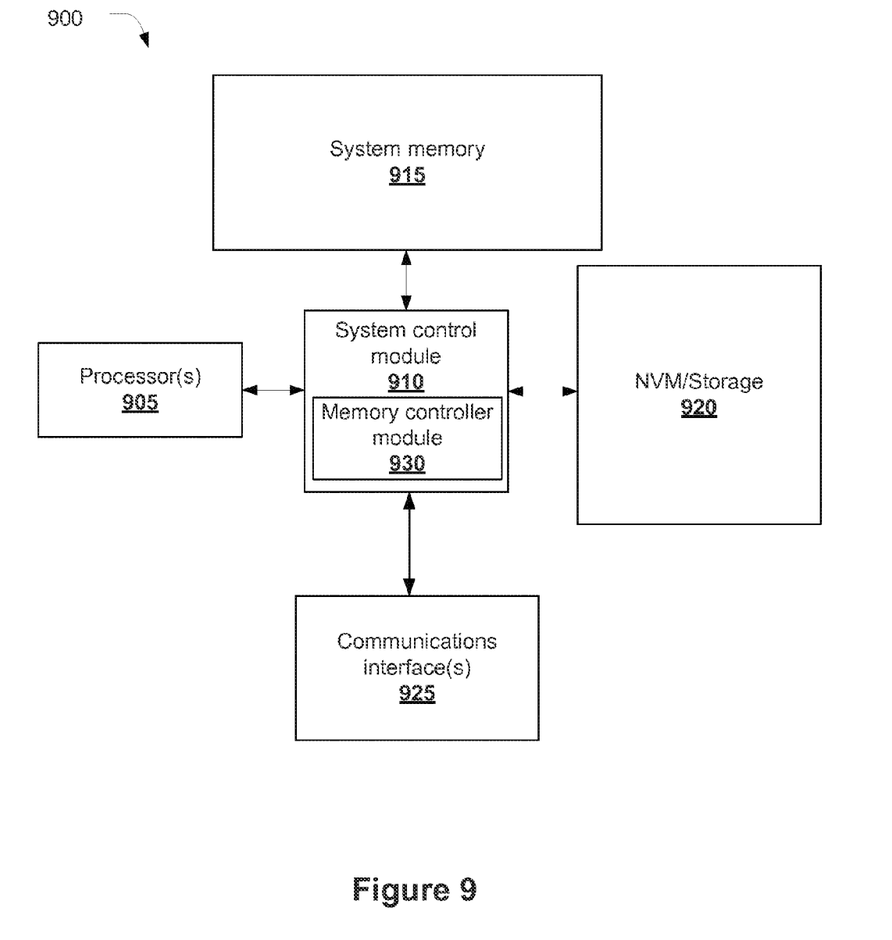
FIG. 9 schematically illustrates an example system that may be used to practice various embodiments described herein.

Embodiments of the present disclosure may be implemented into a system using any suitable hardware and/or software to configure as desired. FIG. 9 schematically illustrates an example system 900 that may be used to practice various embodiments described herein. FIG. 9 illustrates, for one embodiment, an example system 900 having one or more processor(s) 905, system control module 910 coupled to at least one of the processor(s) 905, system memory 915 coupled to system control module 910, non-volatile memory (NVM)/storage 920 coupled to system control module 910, and one or more communications interface(s) 925 coupled to system control module 910.

In some embodiments, the system 900 may be capable of functioning as the UE 110 or 205 as described herein. In other embodiments, the system 900 may be capable of functioning as one of BSEs 105 or 210, as described herein. In other embodiments, the system In 100 may be capable of functioning is computer 215. In some embodiments, the system 900 may include one or more computer-readable media (e.g., system memory or NVM/storage 920) having instructions and one or more processors (e.g., processor(s) 905) coupled with the one or more computer-readable media and configured to execute the instructions to implement a module to perform actions described herein.

System control module 910 for one embodiment may include any suitable interface controllers to provide for any suitable interface to at least one of the processor(s) 905 and/or to any suitable device or component in communication with system control module 910.

System control module 910 may include memory controller module 930 to provide an interface to system memory 915. The memory controller module 930 may be a hardware module, a software module, and/or a firmware module.

System memory 915 may be used to load and store data and/or instructions, for example, for system 900. System memory 915 for one embodiment may include any suitable volatile memory, such as suitable DRAM, for example. In some embodiments, the system memory 915 may include double data rate type four synchronous dynamic random-access memory (DDR4 SDRAM).

System control module 910 for one embodiment may include one or more input/output (I/O) controller(s) to provide an interface to NVM/storage 920 and communications interface(s) 925.

The NVM/storage 920 may be used to store data and/or instructions, for example. NVM/storage 920 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 920 may include a storage resource physically part of a device on which the system 900 may be installed or it may be accessible by, but not necessarily a part of, the device. For example, the NVM/storage 920 may be accessed over a network via the communications interface(s) 925.

Communications interface(s) 925 may provide an interface for system 900 to communicate over one or more network(s) and/or with any other suitable device. The system 900 may wirelessly communicate with the one or more components of the wireless network in accordance with any of one or more wireless network standards and/or protocols. In some embodiments the communications interface(s) 925 may include the transceiver modules 122 or 135.

For one embodiment, at least one of the processor(s) 905 may be packaged together with logic for one or more controller(s) of system control module 910, e.g., memory controller module 930. For one embodiment, at least one of the processor(s) 905 may be packaged together with logic for one or more controllers of system control module 910 to form a System in Package (SiP). For one embodiment, at least one of the processor(s) 905 may be integrated on the same die with logic for one or more controller(s) of system control module 910. For one embodiment, at least one of the processor(s) 905 may be integrated on the same die with logic for one or more controller(s) of system control module 910 to form a System on Chip (SoC).

In some embodiments the processor(s) 905 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or GPS circuitry (not shown).

In various embodiments, the system 900 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 900 may have more or less components, and/or different architectures. For example, in some embodiments, the system 900 includes one or more of a camera, a keyboard, liquid crystal display (LCD) screen (including touch screen displays), non-volatile memory port, multiple antennas, graphics chip, application-specific integrated circuit (ASIC), and speakers.

EXAMPLES

A first example may include an apparatus comprising: a receiver module to receive, for a modulation and coding scheme (MCS), an indication of a throughput of a user equipment (UE) for a transmission that is transmitted using the MCS at a first signal level and an indication of a throughput of the UE for a transmission that is transmitted using the MCS at a second signal level that is lower than the first signal level; and a processor coupled with the receiver module, the processor to identify, based on the throughputs of the UE for the transmissions at the first and second signal levels, a third signal level that corresponds to a target throughput for the MCS.

Example 2 may include the apparatus of example 1, wherein the target throughput is a percentage of a maximum throughput of the UE.

Example 3 may include the apparatus of example 1, wherein the target throughput indicates a desired performance of the UE for the MCS.

Example 4 may include the apparatus of any of examples 1-3, wherein the throughput of the UE for the transmission at the first signal level is measured over a first number of subframes, and wherein the throughput of the UE for the transmission at the second signal level is measured over a second number of subframes; and wherein the processor is to identify the third signal level based on interpolation of the throughput of the UE for the transmission at the second signal level without the use of an indication of the throughput of the UE for a transmission that is transmitted using the MCS at the third signal level.

Example 5 may include the apparatus of example 4, wherein the first number of subframes is 1000 subframes, and wherein the second number of subframes is 20000 subframes.

Example 6 may include the apparatus of any of examples 1-3, wherein the receiver is further to receive an indication of a throughput of the UE for a transmission at a fourth signal level that is between the first signal level and the second signal level; and wherein the processor is further to identify the third signal level based on the throughput of the UE for the transmission at the fourth signal level.

Example 7 may include the apparatus of any of examples 1-3, wherein the receiver is further to receive an indication of a throughput of the UE for a transmission at the third signal level after the UE has been rotated.

Example 8 may include the apparatus of any of examples 1-3, further comprising a display coupled with the processor.

Example 9 may include a method comprising: measuring, over a first number of subframes, throughput of a user equipment (UE) for a transmission transmitted at a first signal strength level using a modulation and coding scheme (MCS); measuring, over the first number of subframes, throughput of the UE for a transmission using the MCS that is transmitted at a second signal strength level that is less than the first signal strength level; measuring, based on an identification that throughput of the UE at the second signal strength level is less than a target throughput, throughput of the UE for a transmission using the MCS that is transmitted at a third signal strength level over a second number of subframes; measuring, over the second number of subframes, throughput of the UE that is higher than the target throughput for a transmission that is transmitted using the MCS at a fourth signal strength level; and interpolating, based on the measuring of the throughput at the third signal strength level and the fourth signal strength level, a fifth signal strength level that corresponds to the target throughput.

Example 10 may include the method of example 9, wherein the first number of subframes is less than half the second number of subframes and the second signal strength level is equal to the third signal strength level.

Example 11 may include the method of example 10, wherein the first number of subframes is approximately 1000 subframes and the second number of subframes is approximately 20000 subframes.

Example 12 may include the method of example 9, wherein the target throughput is a percentage of a maximum throughput of the UE.

Example 13 may include the method of example 9, wherein the target throughput indicates a performance of the UE for the MCS.

Example 14 may include the method of any of examples 9-13, further comprising: measuring throughput of the UE for a transmission transmitted using the MCS at the fifth signal strength level after the UE has been rotated; if throughput of the UE at the fifth signal strength is above the target throughput, then measuring throughput of the UE at a signal strength level that is below the fifth signal strength level, and if the throughput of the fifth signal strength level is below the target throughput, then measuring throughput of the UE at a signal strength level that is above the fifth signal strength level.

Example 15 may include one or more non-transitory computer readable media comprising instructions to cause a computing device, upon execution of the instructions by one or more processors of the computing device, to: identify throughput of a user equipment (UE) for a transmission transmitted using a modulation and coding scheme (MCS) at a high signal strength level and a transmission transmitted using the MCS at a low signal strength level; identify throughput of the UE for a transmission transmitted using the MCS at a first signal strength level that is between the high signal strength level and the low signal strength level; if the throughput of the UE at the first signal strength level is below a target throughput, identify throughput of the UE for a transmission transmitted using the MCS at a second signal strength level that is between the first signal strength level and the high signal strength level; if the throughput of the UE at the first signal strength level is above the target throughput, identify throughput of the UE for a transmission transmitted using the MCS at a third signal strength level that is between the first signal strength level and the low signal strength level; and interpolate, based on the throughput of the UE at the second or third signal strength levels, a fourth signal strength level that corresponds to the target throughput.

Example 16 may include the one or more computer readable media of example 15, wherein the target throughput is a percentage of a maximum throughput of the UE.

Example 17 may include the one or more computer readable media of example 15, wherein the target throughput indicates a performance of the UE for the MCS.

Example 18 may include the one or more computer readable media of any of examples 15-17, wherein the high signal strength level is a signal strength level that corresponds to a maximum throughput for the UE.

Example 19 may include the one or more computer readable media of any of examples 15-17, wherein the low signal strength level is a signal strength level that corresponds to a minimum throughput for the UE.

Example 20 may include the one or more computer readable media of any of examples 15-17, further comprising instructions to: identify throughput of the UE for a transmission transmitted at the fourth signal strength level after the UE has been rotated; if the throughput of the UE at the fourth signal strength level is above the target throughput, then identify throughput of the UE for a transmission transmitted using the MCS at a signal strength level that is below the fourth signal strength level, and if the throughput of the UE at the fourth signal strength level is below the target throughput, then identify throughput of the UE for a transmission that is transmitted using the MCS at a signal strength level that is above the fourth signal strength level.

Example 21 may include a method comprising: receiving, for a modulation and coding scheme (MCS), an indication of a throughput of a user equipment (UE) for a transmission that is transmitted using the MCS at a first signal level and an indication of a throughput of the UE for a transmission that is transmitted using the MCS at a second signal level that is lower than the first signal level; and identifying, based on the throughputs of the UE for the transmissions at the first and second signal levels, a third signal level that corresponds to a target throughput for the MCS.

Example 22 may include the method of example 21, wherein the target throughput is a percentage of a maximum throughput of the UE.

Example 23 may include the method of example 21, wherein the target throughput indicates a desired performance of the UE for the MCS.

Example 24 may include the method of any of examples 21-23, wherein the throughput of the UE for the transmission at the first signal level is measured over a first number of subframes, and wherein the throughput of the UE for the transmission at the second signal level is measured over a second number of subframes; and further comprising identifying the third signal level based on interpolation of the throughput of the UE for the transmission at the second signal level without the use of an indication of the throughput of the UE for a transmission that is transmitted using the MCS at the third signal level.

Example 25 may include the method of example 24, wherein the first number of subframes is 1000 subframes, and wherein the second number of subframes is 20000 subframes.

Example 26 may include the method of any of examples 21-23, further comprising receiving an indication of a throughput of the UE for a transmission at a fourth signal level that is between the first signal level and the second signal level; and identifying the third signal level based on the throughput of the UE for the transmission at the fourth signal level.

Example 27 may include the method of any of examples 21-23, further comprising receiving an indication of a throughput of the UE for a transmission at the third signal level after the UE has been rotated.

Example 28 may include one or more non-transitory computer readable media comprising instructions to, upon execution of the instructions by one or more processors of a computing device, perform the method of any of examples 21-27.

Example 29 may include an apparatus comprising means to perform the method of any of examples 21-27.

Example 30 may include one or more non-transitory computer readable media comprising instructions to, upon execution of the instructions by one or more processors of a computing device, perform the method of any of examples 9-14.

Example 31 may include an apparatus comprising means to perform the method of any of examples 9-14.

Example 32 may include a method comprising: identifying throughput of a user equipment (UE) for a transmission transmitted using a modulation and coding scheme (MCS) at a high signal strength level and a transmission transmitted using the MCS at a low signal strength level; identifying throughput of the UE for a transmission transmitted using the MCS at a first signal strength level that is between the high signal strength level and the low signal strength level; if the throughput of the UE at the first signal strength level is below a target throughput, identifying throughput of the UE for a transmission transmitted using the MCS at a second signal strength level that is between the first signal strength level and the high signal strength level; if the throughput of the UE at the first signal strength level is above the target throughput, identifying throughput of the UE for a transmission transmitted using the MCS at a third signal strength level that is between the first signal strength level and the low signal strength level; and interpolating, based on the throughput of the UE at the second or third signal strength levels, a fourth signal strength level that corresponds to the target throughput.

Example 33 may include the method of example 32, wherein the target throughput is a percentage of a maximum throughput of the UE.

Example 34 may include the method of example 32, wherein the target throughput indicates a performance of the UE for the MCS.

Example 35 may include the method of any of examples 32-34, wherein the high signal strength level is a signal strength level that corresponds to a maximum throughput for the UE.

Example 36 may include the method of any of examples 32-34, wherein the low signal strength level is a signal strength level that corresponds to a minimum throughput for the UE.

Example 37 may include the method of any of examples 32-34, further comprising: identifying throughput of the UE for a transmission transmitted at the fourth signal strength level after the UE has been rotated; if the throughput of the UE at the fourth signal strength level is above the target throughput, then identifying throughput of the UE for a transmission transmitted using the MCS at a signal strength level that is below the fourth signal strength level, and if the throughput of the UE at the fourth signal strength level is below the target throughput, then identifying throughput of the UE for a transmission that is transmitted using the MCS at a signal strength level that is above the fourth signal strength level.

Example 38 may include an apparatus comprising means to perform the method of any of claims 32-37.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus comprising:
    a transceiver module to transmit a signal to a user equipment (UE); and
    a processor coupled with the transceiver module, the processor to:
        identify, for a modulation and coding scheme (MCS), a throughput of the UE for a transmission that is transmitted using the MCS at a first signal level;
        identify a throughput of the UE for a transmission that is transmitted using the MCS at a second signal level that is lower than the first signal level; and
        identify, based on the throughputs of the UE for the transmissions at the first and second signal levels, a third signal level that corresponds to a target throughput for the MCS.

2. The apparatus of claim 1, wherein the target throughput is a percentage of a maximum throughput of the UE.

3. The apparatus of claim 1, wherein the target throughput indicates a desired performance of the UE for the MCS.

4. The apparatus of claim 1, wherein the throughput of the UE for the transmission at the first signal level is measured over a first number of subframes, and wherein the throughput of the UE for the transmission at the second signal level is measured over a second number of subframes; and
wherein the processor is to identify the third signal level based on interpolation of the throughput of the UE for the transmission at the second signal level without the use of an indication of the throughput of the UE for a transmission that is transmitted using the MCS at the third signal level.

5. The apparatus of claim 4, wherein the first number of subframes is 1000 subframes, and wherein the second number of subframes is 20000 subframes.

6. The apparatus of claim 1, wherein the processor is further to identify a throughput of the UE for a transmission at a fourth signal level that is between the first signal level and the second signal level; and
wherein the processor is further to identify the third signal level based on the throughput of the UE for the transmission at the fourth signal level.

7. The apparatus of claim 1, wherein the processor is further to identify a throughput of the UE for a transmission at the third signal level after the UE has been rotated.

8. The apparatus of claim 1, further comprising a display coupled with the processor.

9. A method comprising:
measuring, over a first number of subframes, throughput of a user equipment (UE) for a transmission transmitted at a first signal strength level using a modulation and coding scheme (MCS);
measuring, over the first number of subframes, throughput of the UE for a transmission using the MCS that is transmitted at a second signal strength level that is less than the first signal strength level;
measuring, based on an identification that throughput of the UE at the second signal strength level is less than a target throughput, throughput of the UE for a transmission using the MCS that is transmitted at a third signal strength level over a second number of subframes;
measuring, over the second number of subframes, throughput of the UE that is higher than the target throughput for a transmission that is transmitted using the MCS at a fourth signal strength level; and
interpolating, based on the measuring of the throughput at the third signal strength level and the fourth signal strength level, a fifth signal strength level that corresponds to the target throughput.

10. The method of claim 9, wherein the first number of subframes is less than half the second number of subframes and the second signal strength level is equal to the third signal strength level.

11. The method of claim 10, wherein the first number of subframes is approximately 1000 subframes and the second number of subframes is approximately 20000 subframes.

12. The method of claim 9, wherein the target throughput is a percentage of a maximum throughput of the UE.

13. The method of claim 9, wherein the target throughput indicates a performance of the UE for the MCS.

14. The method of claim 9, further comprising:
measuring throughput of the UE for a transmission transmitted using the MCS at the fifth signal strength level after the UE has been rotated;
if throughput of the UE at the fifth signal strength is above the target throughput, then measuring throughput of the UE at a signal strength level that is below the fifth signal strength level, and if the throughput of the fifth signal strength level is below the target throughput, then measuring throughput of the UE at a signal strength level that is above the fifth signal strength level.

15. One or more non-transitory computer readable media comprising instructions to cause a computing device, upon execution of the instructions by one or more processors of the computing device, to:
identify throughput of a user equipment (UE) for a transmission transmitted using a modulation and coding scheme (MCS) at a high signal strength level and a transmission transmitted using the MCS at a low signal strength level;
identify throughput of the UE for a transmission transmitted using the MCS at a first signal strength level that is between the high signal strength level and the low signal strength level;
if the throughput of the UE at the first signal strength level is below a target throughput, identify throughput of the UE for a transmission transmitted using the MCS at a second signal strength level that is between the first signal strength level and the high signal strength level;
if the throughput of the UE at the first signal strength level is above the target throughput, identify throughput of the UE for a transmission transmitted using the MCS at a third signal strength level that is between the first signal strength level and the low signal strength level; and
interpolate, based on the throughput of the UE at the second or third signal strength levels, a fourth signal strength level that corresponds to the target throughput.

16. The one or more computer readable media of claim 15, wherein the target throughput is a percentage of a maximum throughput of the UE.

17. The one or more computer readable media of claim 15, wherein the target throughput indicates a performance of the UE for the MCS.

18. The one or more computer readable media of claim 15, wherein the high signal strength level is a signal strength level that corresponds to a maximum throughput for the UE.

19. The one or more computer readable media of claim 15, wherein the low signal strength level is a signal strength level that corresponds to a minimum throughput for the UE.

20. The one or more computer readable media of claim 15, further comprising instructions to:
identify throughput of the UE for a transmission transmitted at the fourth signal strength level after the UE has been rotated;
if the throughput of the UE at the fourth signal strength level is above the target throughput, then identify throughput of the UE for a transmission transmitted using the MCS at a signal strength level that is below the fourth signal strength level, and if the throughput of the UE at the fourth signal strength level is below the target throughput, then identify throughput of the UE for a transmission that is transmitted using the MCS at a signal strength level that is above the fourth signal strength level.

* * * * *